US010872300B2

(12) United States Patent
Zhao

(10) Patent No.: US 10,872,300 B2
(45) Date of Patent: Dec. 22, 2020

(54) ARTIFICIAL INTELLIGENT SYSTEMS AND METHODS FOR USING A STRUCTURALLY SIMPLER LEARNER MODEL TO MIMIC BEHAVIORS OF A STRUCTURALLY MORE COMPLICATED REFERENCE MODEL

(71) Applicant: BEIJING DIDI INFINITY TECHNOLOGY AND DEVELOPMENT CO., LTD., Beijing (CN)

(72) Inventor: Yuan Zhao, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 16/930,341

(22) Filed: Jul. 16, 2020

(65) Prior Publication Data

US 2020/0349471 A1 Nov. 5, 2020

Related U.S. Application Data

(63) Continuation of application No. PCT/CN2018/114760, filed on Nov. 9, 2018.

(30) Foreign Application Priority Data

Nov. 6, 2018 (CN) .......................... 2018 1 1310614

(51) Int. Cl.
*G06N 20/00* (2019.01)
*G06K 9/62* (2006.01)
*G06N 5/04* (2006.01)

(52) U.S. Cl.
CPC ........... *G06N 20/00* (2019.01); *G06K 9/6215* (2013.01); *G06N 5/046* (2013.01)

(58) Field of Classification Search
CPC .......... G06N 20/00; G06N 5/04; G06N 5/046; G06K 9/62; G06K 9/6215
(Continued)

(56) References Cited

U.S. PATENT DOCUMENTS 9,066,404 B2 * 6/2015 Paolini .................. H05B 45/20
10,339,591 B2 * 7/2019 Paolini ............... G06Q 30/0601
(Continued)

FOREIGN PATENT DOCUMENTS

| CN | 104850531 A | 8/2015 |
| CN | 108399406 A | 8/2018 |
| CN | 108595708 A | 9/2018 |

OTHER PUBLICATIONS

International Search Report in PCT/CN2018/114760 dated Aug. 6, 2019, 4 pages.
(Continued)

*Primary Examiner* — Michael B Holmes
(74) *Attorney, Agent, or Firm* — Metis IP LLC

(57) ABSTRACT

A method for using a structurally more complicated reference model to train a structurally simpler learner model includes: obtaining a trained reference model at least including N reference blocks and a learner model at least including N learner blocks respectively corresponding to the N reference blocks; training the learner model by conducting an iterative operation; determining whether the learner model is convergent; and in response to that the learner model is convergent, stopping the iterative operation to assign the learner model as a trained learner model. The iterative operation includes inputting a sample data set into the trained reference model and the learner model; for each of the N learner blocks: determining a distance between a learner vector of the learner block and a reference vector of
(Continued)

the reference block, and updating parameters in the learner block based on the determined distance.

20 Claims, 10 Drawing Sheets

(58) Field of Classification Search
USPC .............................................................. 706/1
See application file for complete search history.

(56) References Cited

U.S. PATENT DOCUMENTS

| | | | |
|---|---|---|---|
| 2006/0074831 A1* | 4/2006 | Hyder | G06N 5/02 |
| | | | 706/45 |
| 2011/0137757 A1* | 6/2011 | Paolini | G06Q 30/0601 |
| | | | 705/27.1 |
| 2015/0287110 A1* | 10/2015 | Paolini | H05B 47/18 |
| | | | 705/26.1 |
| 2017/0213127 A1 | 7/2017 | Duncan | |

OTHER PUBLICATIONS

Written Opinion in PCT/CN2018/114760 dated Aug. 6, 2019, 4 pages.

* cited by examiner

ARTIFICIAL INTELLIGENT SYSTEMS AND METHODS FOR USING A STRUCTURALLY SIMPLER LEARNER MODEL TO MIMIC BEHAVIORS OF A STRUCTURALLY MORE COMPLICATED REFERENCE MODEL

CROSS-REFERENCE TO RELATED APPLICATIONS

This application is a continuation of International Application No. PCT/CN2018/114760, filed on Nov. 9, 2018, which claims priority of Chinese Application No. 201811310614.4, filed on Nov. 6, 2018, the contents of which are incorporated herein in its entirety by reference.

TECHNICAL FIELD

The present disclosure generally relates to artificial intelligence systems and methods for using a structurally simpler learner model to mimic behaviors of a structurally more complicated reference model.

BACKGROUND

With the development of artificial intelligence, deep learning is becoming increasingly popular. Deep learning is a type of machine learning that trains a model to perform human-like tasks, such as detecting objects, recognizing speech, identifying images, or making predictions. Deep learning is generally computationally intensive, which may limit their application on a computing platform with limited computational power (e.g., a mobile phone, an in-vehicle device). An effective way to solve this problem is to use a structurally simpler learner model to mimic behaviors of a structurally more complicated reference model, which may greatly reduce the computational overheads. The performance of the learner model may be affected by the information of the structurally more complicated reference model that used in training the learner model. Therefore, it is desirable to provide artificial intelligence systems and methods for developing a more effective learner model to mimic behaviors of the structurally more complicated reference model.

SUMMARY

An aspect of the present disclosure introduces an artificial intelligent system for using a structurally simpler learner model to mimic behaviors of a structurally more complicated reference model, comprising: at least one storage medium including a set of instructions for training a learner model; and at least one processor in communication with the storage medium. Wherein when executing the set of instructions, the at least one processor is directed to: obtain a trained reference model at least including N reference blocks, wherein N is an integer greater than 2; obtain a learner model at least including N learner blocks respectively corresponding to the N reference blocks of the trained reference model; train the learner model into a trained learner model by conducting an iterative operation by: inputting a sample data set into the trained reference model and the learner model; for each of the N learner blocks: determining a reference vector based on an output of the reference block corresponding to the learner block, determining a learner vector based on an output of the learner block, wherein a length of the reference vector equals a length of the learner vector, determining a distance between the reference vector and the learner vector to obtain a learning signal, and updating parameters in the learner block by inputting the distance into the learner block as a learning signal; determine whether the learner model is convergent; and in response to a determination that the learner model is convergent, stop the iterative operation to assign the learner model as the trained learner model.

In some embodiments, each of the N reference blocks includes at least one reference layer, and each of the N learner blocks includes at least one learner layers.

In some embodiments, a total number of learner blocks in the learner model is less than a total number of reference blocks in the trained reference model; a total number of learner layers in the learner model is less than a total number of reference layers in the trained reference model; and a total number of nodes in each learner layer is less than a total number of nodes in each reference layer.

In some embodiments, the at least one processor is further directed to: map an output of each reference block into a reference vector including a predetermined length; and map an output of each learner block into a learner vector including the predetermined length.

In some embodiments, the distance between the learner vector and the reference vector includes at least one of: a Cross Entropy, a Mutual Information, a Kullback-Leibler Divergence, an Euclidean Distance, or an Edit Distance.

In some embodiments, during a current iterative operation to determine whether the learner model is convergent, the at least one processor is further directed to: determine a difference value between parameters of a current learner model in the current iterative operation and parameters of a last learner model in a last iterative operation; determine whether the difference value is less than a difference threshold; and in response to a determination that the difference value is less than a difference threshold, determine that the learner model is convergent.

In some embodiments, the at least one processor is further directed to: train a plurality of learner models to obtain a plurality of trained learner models, wherein each learner model in the plurality of learner models is different from one another; and test the plurality of trained learner models to obtain a final trained learner model.

In some embodiments, to test the plurality of trained learner models, the at least one processor is further directed to: for each of the plurality of trained learner models, determine an output difference between the trained learner model and the trained reference model using a test dataset as inputs of the trained learner model and the trained reference model; and determine a final trained learner model from the plurality of trained learner models based on the plurality of output differences.

In some embodiments, the parameters in each learner block are updated based on the corresponding learning signal and a Gradient Descent algorithm.

According to another aspect of the present disclosure, an artificial intelligent method for using a structurally simpler learner model to mimic behaviors of a structurally more complicated reference model, comprising: obtaining a trained reference model at least including N reference blocks, wherein N is an integer greater than 2; obtaining a learner model at least including N learner blocks respectively corresponding to the N reference blocks of the trained reference model; training the learner model into a trained learner model by conducting an iterative operation by: inputting a sample data set into the trained reference model and the learner model; for each of the N learner blocks: determining a reference vector based on an output of the reference block corresponding to the learner block, determining a learner vector based on an output of the learner block, wherein a length of the reference vector equals a length of the learner vector, determining a distance between the reference vector and the learner vector to obtain a learning signal, and updating parameters in the learner block by inputting the distance into the learner block as a learning signal; determining whether the learner model is convergent; and in response to a determination that the learner model is convergent, stopping the iterative operation to assign the learner model as the trained learner model.

In some embodiments, each of the N reference blocks includes at least one reference layer, and each of the N learner blocks includes at least one learner layers.

In some embodiments, a total number of learner blocks in the learner model is less than a total number of reference blocks in the trained reference model; a total number of learner layers in the learner model is less than a total number of reference layers in the trained reference model; and a total number of nodes in each learner layer is less than a total number of nodes in each reference layer.

In some embodiments, the method may further include: mapping an output of each reference block into a reference vector including a predetermined length; and mapping an output of each learner block into a learner vector including the predetermined length.

In some embodiments, the distance between the learner vector and the reference vector includes at least one of: a Cross Entropy, a Mutual Information, a Kullback-Leibler Divergence, an Euclidean Distance, or an Edit Distance.

In some embodiments, during a current iterative operation, the determining whether the learner model is convergent may further include: determining a difference value between parameters of a current learner model in the current iterative operation and parameters of a last learner model in a last iterative operation; determining whether the difference value is less than a difference threshold; and in response to a determination that the difference value is less than a difference threshold, determining that the learner model is convergent.

In some embodiments, the method may further include: training a plurality of learner models to obtain a plurality of trained learner models, wherein each learner model in the plurality of learner models is different from one another; and testing the plurality of trained learner models to obtain a final trained learner model.

In some embodiments, the testing of the plurality of trained learner models further may include: for each of the plurality of trained learner models, determining an output difference between the trained learner model and the trained reference model using a test dataset as inputs of the trained learner model and the trained reference model; and determining a final trained learner model from the plurality of trained learner models based on the plurality of output differences.

In some embodiments, the parameters in each learner block are updated based on the corresponding learning signal and a Gradient Descent algorithm.

According to still another aspect of the present disclosure, a non-transitory computer readable medium, comprising an operation system and at least one set of instructions compatible with the operation system for using a structurally simpler learner model to mimic behaviors of a structurally more complicated reference model, wherein when executed by at least one processor of one or more electronic device, the at least one set of instructions directs the at least one processor to: obtain a trained reference model at least including N reference blocks, wherein N is an integer greater than 2; obtain a learner model at least including N learner blocks respectively corresponding to the N reference blocks of the trained reference model; train the learner model into a trained learner model by conducting an iterative operation by: inputting a sample data set into the trained reference model and the learner model; for each of the N learner blocks: determining a reference vector based on an output of the reference block corresponding to the learner block, determining a learner vector based on an output of the learner block, wherein a length of the reference vector equals a length of the learner vector, determining a distance between the reference vector and the learner vector to obtain a learning signal, and updating parameters in the learner block by inputting the distance into the learner block as a learning signal; determine whether the learner model is convergent; and in response to a determination that the learner model is convergent, stop the iterative operation to assign the learner model as the trained learner model.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
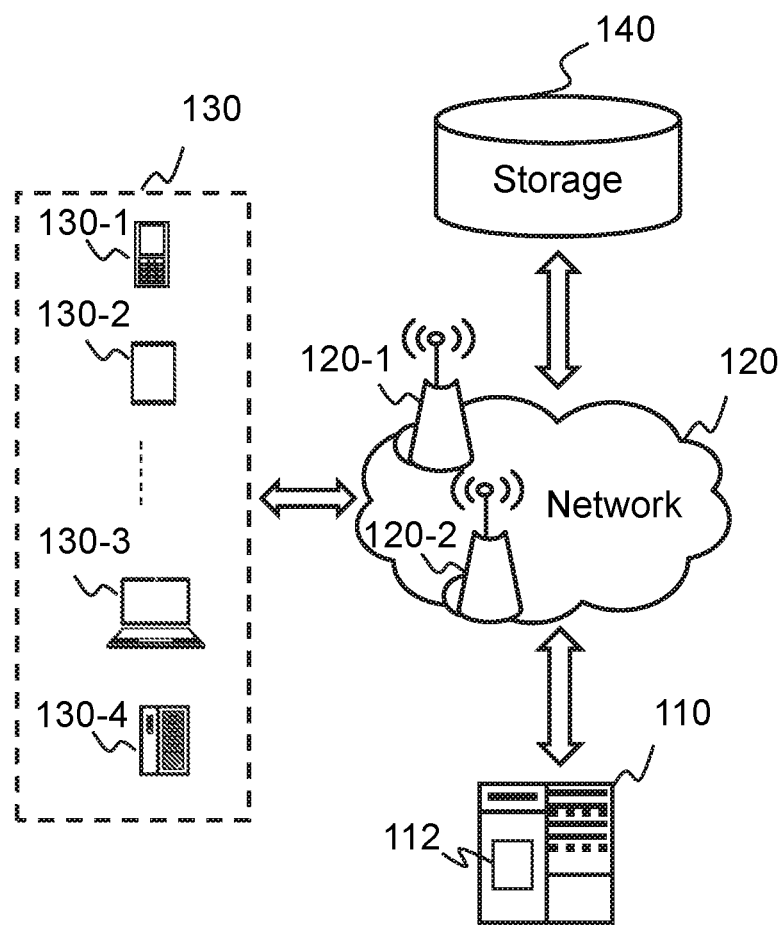
FIG. 1 is a schematic diagram illustrating an exemplary artificial intelligent (AI) system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operations and functions of the related elements of structure and the combination of parts and economies of manufacture, may become more apparent upon consideration of the following description with reference to the accompanying drawing(s), all of which form part of this specification. It is to be expressly understood, however, that the drawing(s) are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

An aspect of the present disclosure relates to artificial intelligence systems and methods for using a structurally simpler learner model to mimic behaviors of a structurally more complicated reference model. To this end, the artificial intelligence systems and methods may use a trained structurally more complicated reference model to train a structurally simpler learner model that at least includes a number of learner blocks respectively corresponding to the same number of reference blocks in the trained reference model. Each learner block or each reference block may include a plurality of layers. Then the systems and methods may conduct an iterative operation of using an output of each reference block to train a corresponding output of the corresponding learner block by inputting a same sample data set into the structurally more complicated trained reference model and the structurally simpler learner model, respectively. The difference between each reference block and the corresponding learner block may be smaller and smaller as parameters in the learner block are repeatedly updated. Finally, the entire structurally simpler learner model may be more likely to mimic behaviors of the structurally more complicated reference model after a plurality of iterative operations until the learner block is convergent. In this way, the systems and methods may use information of hidden layers in the trained structurally more complicated reference model to train hidden layers in the structurally simpler learner model to make the learner model learn fully from the trained structurally more complicated reference model.

FIG. 1 is a schematic diagram of an exemplary artificial intelligence (AI) system 100 according to some embodiments of the present disclosure. For example, the AI system 100 may be an online to offline service platform for providing services such as taxi hailing, chauffeur services, delivery vehicles, carpool, bus service, driver hiring, shuttle services, online navigation services, etc. The AI system 100 may include a server 110, a network 120, an electronic device 130, and a storage 140. The server 110 may include a processing engine 112.

The server 110 may be configured to process information and/or data relating to training a learner model. For example, the server 110 may train the learner model using information of a trained reference model. As another example, the server 110 may train a plurality of learner models, and test the plurality of learner models to obtain a final trained learner model. In some embodiments, the server 110 may be a single server, or a server group. The server group may be centralized, or distributed (e.g., server 110 may be a distributed system). In some embodiments, the server 110 may be local or remote. For example, the server 110 may access information and/or data stored in the electronic device 130, and/or the storage 140 via the network 120. As another example, the server 110 may connect the electronic device 130, and/or the storage 140 to access stored information and/or data. In some embodiments, the server 110 may be implemented on a cloud platform. Merely by way of example, the cloud platform may be a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data relating to training the learner model to perform one or more functions described in the present disclosure. For example, the processing engine 112 may train the learner model using information of a trained reference model. As another example, the processing engine 112 may train a plurality of learner models, and test the plurality of learner models to obtain a final trained learner model. In some embodiments, the processing engine 112 may include one or more processing engines (e.g., single-core processing engine(s) or multi-core processor(s)). Merely by way of example, the processing engine 112 may be one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The network 120 may facilitate exchange of information and/or data. In some embodiments, one or more components of the AI system 100 (e.g., the server 110, the electronic device 130, and the storage 140) may transmit information and/or data to other component(s) in the AI system 100 via the network 120. For example, the server 110 may load a trained reference model stored in the storage 140 via the network 120. As another example, after the server 110 trains the learner model, the server 110 may send the trained learner model to the electronic device 130 via the network 120. In some embodiments, the network 120 may be any type of wired or wireless network, or combination thereof. Merely by way of example, the network 130 may be a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the AI system 100 may be connected to the network 120 to exchange data and/or information between them.

The electronic device 130 may be any electronic device that has limited compute capability. For example, the electronic device 130 may be used by a user of the online to offline service. In some embodiments, the electronic device 130 may be a mobile device 130-1, a tablet computer 130-2, a laptop computer 130-3, a desktop computer 130-4, or the like, or any combination thereof. In some embodiments, the mobile device 130-1 may be a wearable device, a smart mobile device, a virtual reality device, an augmented reality device, or the like, or any combination thereof. In some embodiments, the wearable device may be a smart bracelet, a smart footgear, a smart glass, a smart helmet, a smart watch, a smart clothing, a smart backpack, a smart accessory, or the like, or any combination thereof. In some embodiments, the smart mobile device may be a smartphone, a personal digital assistance (PDA), a gaming device, a navigation device, a point of sale (POS) device, or the like, or any combination thereof. In some embodiments, the virtual reality device and/or the augmented reality device may be a virtual reality helmet, a virtual reality glass, a virtual reality patch, an augmented reality helmet, an augmented reality glass, an augmented reality patch, or the like, or any combination thereof. For example, the virtual reality device and/or the augmented reality device may be a Google Glass™, a RiftCon™, a Fragments™, a Gear VR™, etc. In some embodiments, the desktop computer 130-4 may be an onboard computer, an onboard television, etc.

In some embodiments, the electronic device 130 may further include at least one network port. The at least one network port may be configured to send information to and/or receive information from one or more components in the AI system 100 (e.g., the server 110, the storage 140) via the network 120. In some embodiments, the electronic device 130 may be implemented on a computing device 200 having one or more components illustrated in FIG. 2, or a mobile device 300 having one or more components illustrated in FIG. 3 in the present disclosure.

The storage 140 may store data and/or instructions. For example, the storage 140 may store a trained reference model trained by the server 110. As another example, the storage 140 may store data and/or instructions that the server 110 may execute or use to perform exemplary methods described in the present disclosure. In some embodiments, the storage 140 may be a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 140 may be implemented on a cloud platform. Merely by way of example, the cloud platform may be a private cloud, a public cloud, a hybrid cloud, a community cloud, a distributed cloud, an inter-cloud, a multi-cloud, or the like, or any combination thereof.

In some embodiments, the storage 140 may include at least one network port to communicate with other devices in the AI system 100. For example, the storage 140 may be connected to the network 120 to communicate with one or more components of the AI system 100 (e.g., the server 110, the electronic device 130) via the at least one network port. One or more components in the AI system 100 may access the data or instructions stored in the storage 140 via the network 120. In some embodiments, the storage 140 may be directly connected to or communicate with one or more components in the AI system 100 (e.g., the server 110, the electronic device 130). In some embodiments, the storage 140 may be part of the server 110.

In some embodiments, one or more components of the AI system 100 (e.g., the server 110, the electronic device 130) may access the storage 140. For example, one or more components of the AI system 100 may load or run the trained reference model stored in the storage 140 to train the learner model. In some embodiments, the storage 140 may store the trained learner model after training the learner model.

In some embodiments, one or more components of the AI system 100 (e.g., the server 110, the electronic device 130, and the storage 140) may communicate with each other in form of electronic and/or electromagnetic signals, through wired and/or wireless communication. In some embodiments, the AI system 100 may further include at least one information exchange port. The at least one exchange port may be configured to receive information and/or send information relating to the trained reference model and/or the learner model (e.g., in form of electronic signals and/or electromagnetic signals) between any electronic devices in the AI system 100. In some embodiments, the at least one information exchange port may be one or more of an antenna, a network interface, a network port, or the like, or any combination thereof. For example, the at least one information exchange port may be a network port connected to the server 110 to send information thereto and/or receive information transmitted therefrom.

Figure 2:
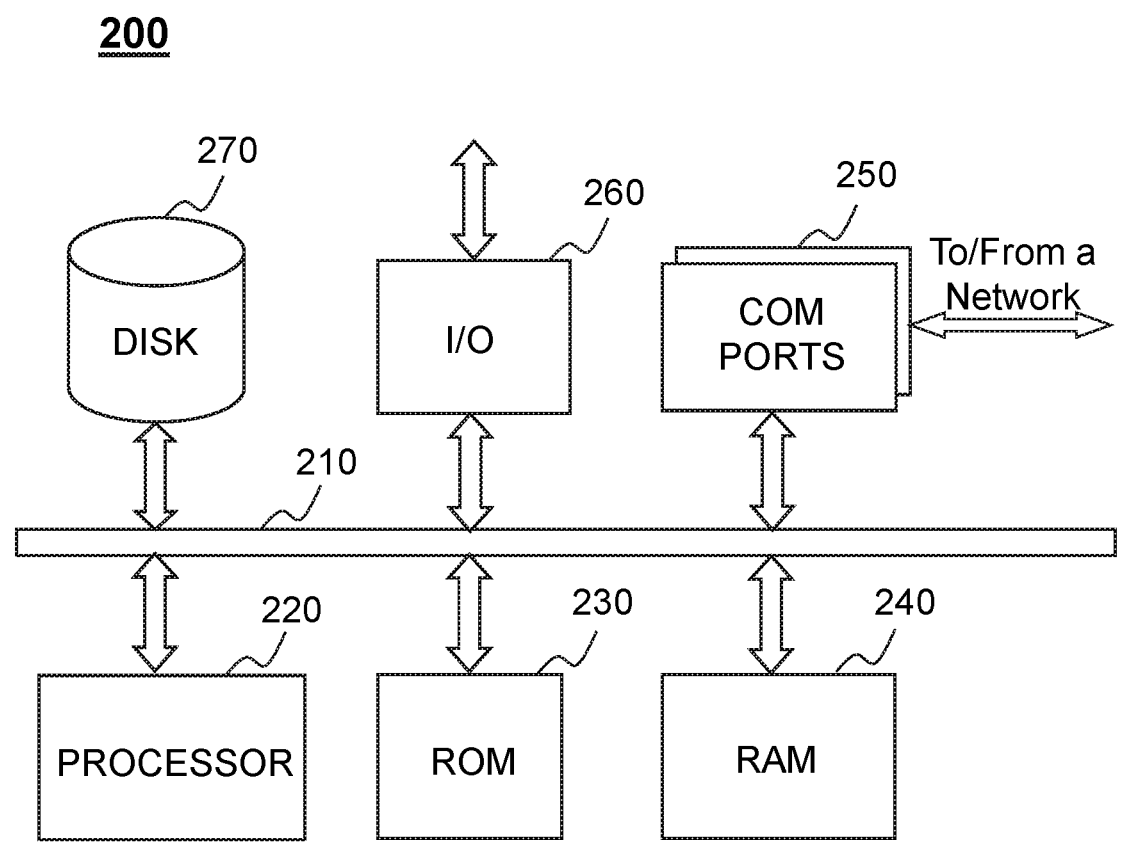
FIG. 2 is a schematic diagram illustrating exemplary hardware and/or software components of a computing device according to some embodiments of the present disclosure.

FIG. 2 is a schematic diagram illustrating exemplary hardware and software components of a computing device 200 on which the server 110, and/or the electronic device 130 may be implemented according to some embodiments of the present disclosure. For example, the processing engine 112 may be implemented on the computing device 200 and configured to perform functions of the processing engine 112 disclosed in this disclosure.

The computing device 200 may be used to implement an AI system 100 for the present disclosure. The computing device 200 may be used to implement any component of AI system 100 that perform one or more functions disclosed in the present disclosure. For example, the processing engine 112 may be implemented on the computing device 200, via its hardware, software program, firmware, or a combination thereof. Although only one such computer is shown, for convenience, the computer functions relating to the online to offline service as described herein may be implemented in a distributed fashion on a number of similar platforms, to distribute the processing load.

The computing device 200, for example, may include COM ports 250 connected to and from a network connected thereto to facilitate data communications. The COM port 250 may be any network port or information exchange port to facilitate data communications. The computing device 200 may also include a processor (e.g., the processor 220), in the form of one or more processors (e.g., logic circuits), for executing program instructions. For example, the processor may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. The processing circuits may also generate electronic signals including the conclusion or the result (e.g., the trained learner model) and a triggering code. In some embodiments, the trigger code may be in a format recognizable by an operation system (or an application installed therein) of an electronic device (e.g., the electronic device 130) in the AI system 100. For example, the trigger code may be an instruction, a code, a mark, a symbol, or the like, or any combination thereof, that can activate certain functions and/or operations of a mobile phone or let the mobile phone execute a predetermined program(s). In some embodiments, the trigger code may be configured to rend the operation system (or the application) of the electronic device to generate a presentation of the conclusion or the result (e.g., a prediction result) on an interface of the electronic device. Then the interface circuits may send out the electronic signals from the processing circuits via the bus 210.

The exemplary computing device may include the internal communication bus 210, program storage and data storage of different forms including, for example, a disk 270, and a read only memory (ROM) 230, or a random access memory (RAM) 240, for various data files to be processed and/or transmitted by the computing device. The exemplary computing device may also include program instructions stored in the ROM 230, RAM 240, and/or other type of non-transitory storage medium to be executed by the processor 220. The methods and/or processes of the present disclosure may be implemented as the program instructions. The exemplary computing device may also include operation systems stored in the ROM 230, RAM 240, and/or other type of non-transitory storage medium to be executed by the processor 220. The program instructions may be compatible with the operation systems for providing the online to offline service. The computing device 200 also includes an I/O component 260, supporting input/output between the computer and other components. The computing device 200 may also receive programming and data via network communications.

Merely for illustration, only one processor is illustrated in FIG. 2. Multiple processors are also contemplated; thus, operations and/or method steps performed by one processor as described in the present disclosure may also be jointly or separately performed by the multiple processors. For example, if in the present disclosure the processor of the computing device 200 executes both step A and step B, it should be understood that step A and step B may also be performed by two different processors jointly or separately in the computing device 200 (e.g., the first processor executes step A and the second processor executes step B, or the first and second processors jointly execute steps A and B).

Figure 3:
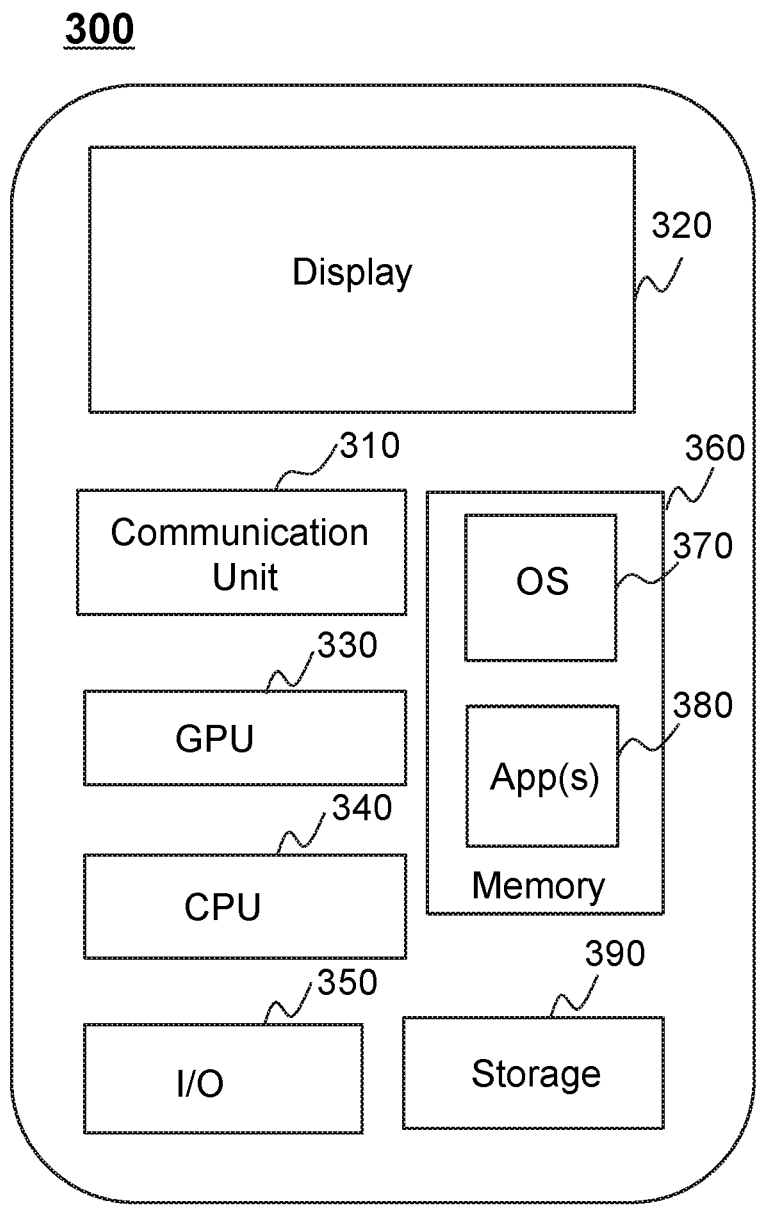
FIG. 3 is a schematic diagram illustrating exemplary hardware and/or software components of a mobile device according to some embodiments of the present disclosure.

FIG. 3 is a schematic diagram illustrating exemplary hardware and/or software components of an exemplary mobile device 300 on which the electronic device 130 may be implemented according to some embodiments of the present disclosure.

As illustrated in FIG. 3, the mobile device 300 may include a communication platform 310, a display 320, a graphic processing unit (GPU) 330, a central processing unit (CPU) 340, an I/O 350, a memory 360, and a storage 390. The CPU may include interface circuits and processing circuits similar to the processor 220. In some embodiments, any other suitable component, including but not limited to a system bus or a controller (not shown), may also be included in the mobile device 300. In some embodiments, a mobile operating system 370 (e.g., iOS™ Android™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to the learner model. User interactions with the information stream may be achieved via the I/O devices 350 and provided to the processing engine 112 and/or other components of the system 100 via the network 120.

To implement various modules, units, and their functionalities described in the present disclosure, computer hardware platforms may be used as the hardware platform(s) for one or more of the elements described herein (e.g., the AI system 100, and/or other components of the AI system 100 described with respect to FIGS. 1-10). The hardware elements, operating systems and programming languages of such computers are conventional in nature, and it is presumed that those skilled in the art are adequately familiar therewith to adapt those technologies to train a learner model as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

One of ordinary skill in the art would understand that when an element of the AI system 100 performs, the element may perform through electrical signals and/or electromagnetic signals. For example, when a server 110 processes a task, such as use a trainted reference model to train a learner model, the server 110 may operate logic circuits in its processor to process such task. When the server 110 completes training the learner model, the processor of the server 110 may generate electrical signals encoding the trained learner model. The processor of the server 110 may then send the electrical signals to at least one information exchange port of a target system associated with the server 110. The server 110 communicates with the target system via a wired network, the at least one information exchange port may be physically connected to a cable, which may further transmit the electrical signals to an input port (e.g., an information exchange port) of the electronic device 130. If the server 110 communicates with the target system via a wireless network, the at least one information exchange port of the target system may be one or more antennas, which may convert the electrical signals to electromagnetic signals. Within an electronic device, such as the electronic device 130, and/or the server 110, when a processor thereof processes an instruction, sends out an instruction, and/or performs an action, the instruction and/or action is conducted via electrical signals. For example, when the processor retrieves or saves data from a storage medium (e.g., the storage 140), it may send out electrical signals to a read/write device of the storage medium, which may read or write structured data in the storage medium. The structured data may be transmitted to the processor in the form of electrical signals via a bus of the electronic device. Here, an electrical signal may be one electrical signal, a series of electrical signals, and/or a plurality of discrete electrical signals.

Figure 4:
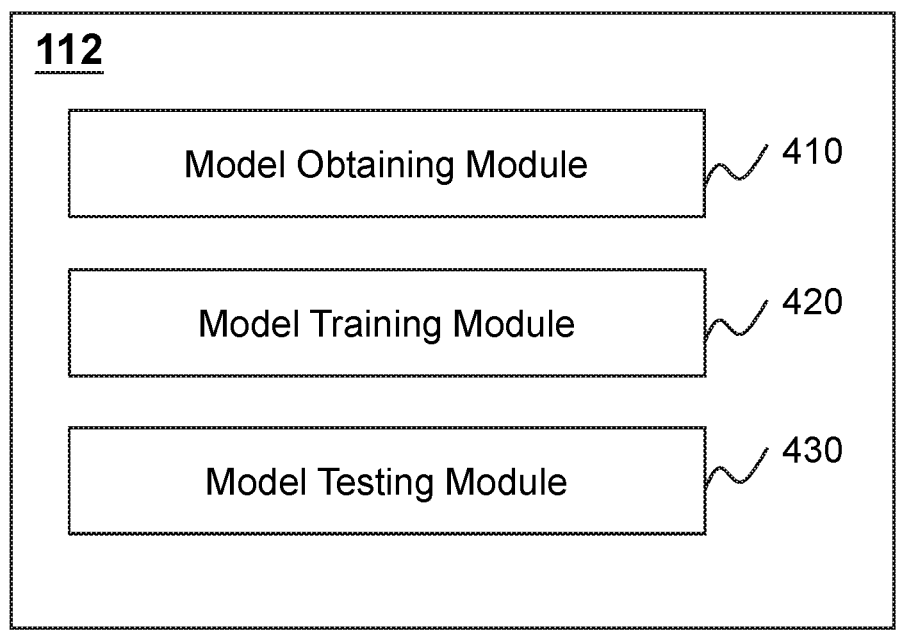
FIG. 4 is a block diagram illustrating an exemplary processing engine according to some embodiments of the present disclosure.

FIG. 4 is a block diagram illustrating an exemplary processing engine 112 according to some embodiments of the present disclosure.

As illustrated in FIG. 4, the processing engine 112 may include a model obtaining module 410, a model training module 420, and a model testing module 430.

The model obtaining module 410 may be configured to obtain a model. For example, the model obtaining module 410 may be configured to obtain a trained reference model. As another example, the model obtaining module 410 may be configured to obtain a learner model.

The model training module 420 may be configured to train the learner model into a trained learner model. For example, the model training module 420 may conduct a plurality of iterative operations to train the learner model. During each iterative operation, the model training module 420 may input a sample data set into the trained reference model and the learner model. For each of the N learner blocks, the model training module 420 may determine a reference vector based on an output of the reference block corresponding to the learner block, and a learner vector based on an output of the learner block. A length of the reference vector equals a length of the learner vector. The model training module 420 may determine a distance between the reference vector and the learner vector, and update parameters in the learner block by inputting the distance to the learner block as a learning signal. As another example, the model training module 420 may determine whether the learner model is convergent, and stop the iterative operation to assign the learner model as the trained learner model.

The model testing module 430 may be configured to test a plurality of trained learner models to obtain a final trained learner model. For example, for each of the plurality of trained learner models, the model testing module 430 may determine an output difference between the trained learner model and the trained reference model using a test data set as inputs of the trained learner model and the trained reference model. The model testing module 430 may determine a final trained learner model from the plurality of trained learner models based on the plurality of output differences.

The modules in the processing engine 112 may be connected to or communicate with each other via a wired connection or a wireless connection. The wired connection may be a metal cable, an optical cable, a hybrid cable, or the like, or any combination thereof. The wireless connection may be a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the model training module 420 and the model testing module 430 may be combined as a single module which may both train a model and test the model. As another example, the processing engine 112 may include a storage module (not shown) used to store data and/or information of the trained reference model and/or the trained learner model.

Figure 5:
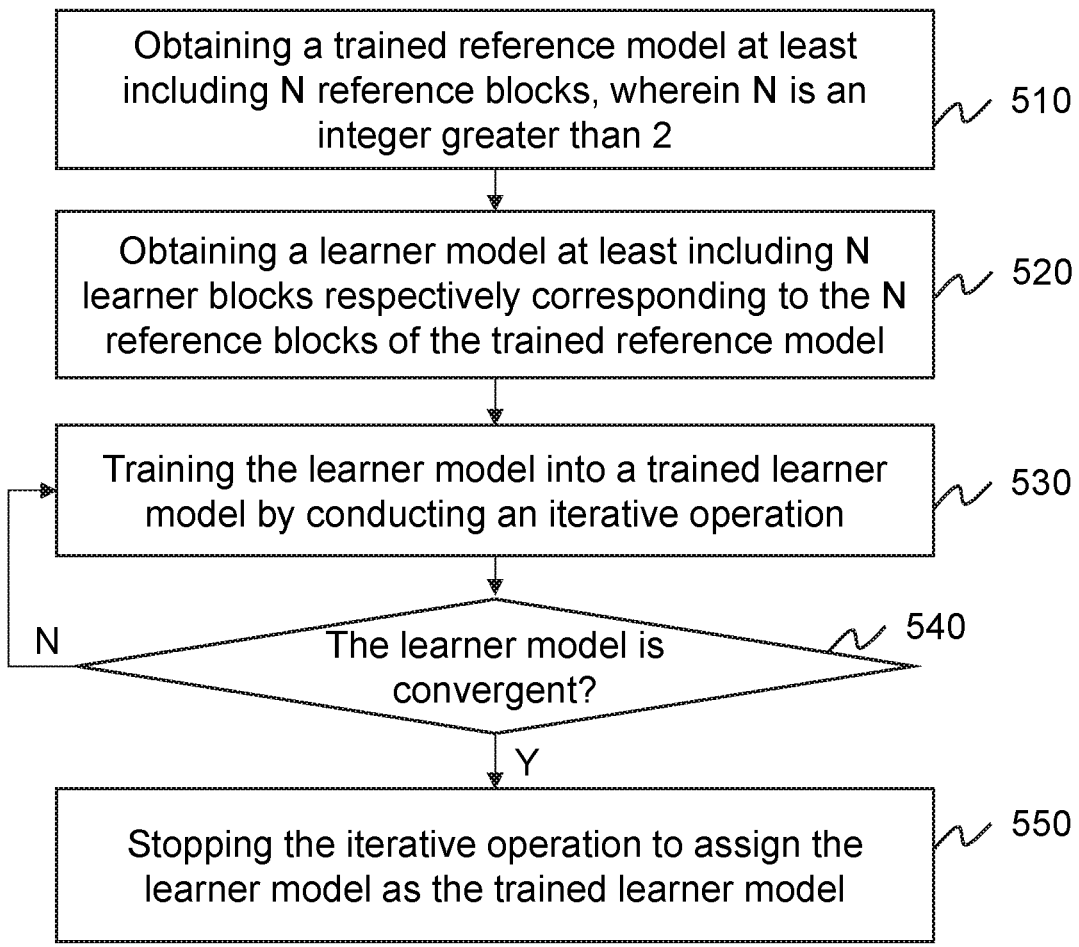
FIG. 5 is a flowchart illustrating an exemplary process for training a learner model according to some embodiments of the present disclosure.

FIG. 5 is a flowchart illustrating an exemplary process 500 for training a learner model according to some embodiments of the present disclosure. The process 500 may be executed by the AI system 100. For example, the process 500 may be implemented as a set of instructions (e.g., an application) stored in the storage ROM 230 or RAM 240. The processor 220 may execute the set of instructions, and when executing the instructions, it may be configured to perform the process 500. The operations of the illustrated process presented below are intended to be illustrative. In some embodiments, the process 500 may be accomplished with one or more additional operations not described and/or without one or more of the operations discussed. Additionally, the order in which the operations of the process as illustrated in FIG. 5 and described below is not intended to be limiting.

In 510, the processing engine 112 (e.g., the processor 220, the model obtaining module 410) may obtain a trained reference model. In some embodiments, the trained reference model may at least include N reference blocks, wherein N is an integer greater than 2.

In some embodiments, the trained reference model may be a trained mathematical model. The trained reference model may have a more complicated structure compared to a learner model, which will be introduced later in this disclosure. For example, the trained reference model may be a neural network model that has a large number of layers, a large number of nodes, a large number of parameters, or the like, or any combination thereof. The trained reference model may be well trained to predict an accurate result. For example, the trained reference model may be trained on a computing platform with a strong computational power with a large amount of sample data from big-data database. The trained reference model may be trained and tested until the trained reference model meets a predetermined condition (e.g., the trained reference model is convergent).

In some embodiments, the processing engine 112 may obtain the trained reference model from a storage device in the AI system 100 (e.g., the storage 140) and/or an external data source (not shown) via the network 120. For example, the trained reference model may be pre-trained (by the processing engine 112 or any other platforms or devices) and stored in the storage device in the AI system 100. The processing engine 112 may access the storage device and retrieve the trained reference model. For example, the processing engine 112 may load or run the trained reference model for further use.

In some embodiments, the trained reference model may include an input reference layer, an output reference layer, and one or more hidden reference layers (also refer to as reference layers) between the input reference layer and the output reference layer. As used herein, a layer of a model (e.g., the reference layer of the trained reference model, a learner layer of a learner model) may refer to a method or a function for processing input data of the layer. Different layers may preform different kinds of processing on their inputs. Each successive layer (e.g., the reference layer, the learner layer) may use output data from a previous layer of the successive layer as input data.

In some embodiments, the trained reference model may include a plurality of reference blocks. Each of the plurality of reference blocks may include one or more successive reference layers. The number of reference layers in each reference block may be the same or different. In some embodiments, each reference block may include a plurality of successive reference layers having a similar structure. In some embodiments, each of the reference layer may include one or more nodes. The number of nodes in each reference layer may be the same or different. In some embodiments, the processing engine 112 may select N reference blocks for training a learner model from the plurality of the reference blocks. N is an integer greater than 2. In some embodiments, N may be a default setting in the AI system 100 or may be adjustable in different situations. For example, N may be 5, 10, 20, 100, etc.

In 520, the processing engine 112 (e.g., the processor 220, the model obtaining module 410) may obtain a learner model. In some embodiments, the learner model may at least include N learner blocks respectively corresponding to the N reference blocks of the trained reference model.

In some embodiments, the learner model may be a structurally simpler mathematical model compared with the trained reference model. The learner model may have a structurally simpler structure than the trained reference model. For example, a total number of learner layers in the learner model may be less than the total number of reference layers in the trained reference model. As another example, a total number of nodes in each learner layer may be less than the total number of nodes in each reference layer. In some embodiments, the learner model may be an initial mathematical model. For example, the processing engine 112 may initialize the learner model by presetting a number of nodes, a number of layers, and/or parameters in the learner model. The number of nodes, the number of layers, and/or parameters in the learner model may be adjustable in different situations.

In some embodiments, the processing engine 112 may obtain the learner model from a storage device in the AI system 100 (e.g., the storage 140) and/or an external data source (not shown) via the network 120. For example, the learner model may be initiated (by the processing engine 112 or any other platforms of devices) and stored in the storage device in the AI system 100. The processing engine 112 may access the storage device and retrieve the learner model. For example, the processing engine 112 may load or run the learner model for further use.

In some embodiments, the learner model may include an input learner layer, an output learner layer, and one or more hidden learner layers (also refer to as learner layers) between the input learner layer and the output learner layer. In some embodiments, the learner model may include a plurality of learner blocks. A total number of learner blocks in the learner model may be the same as or be different from a total number of reference blocks in the trained reference model. For example, the total number of the learner blocks in the learner model may be less than the total number of the reference blocks in the trained reference model. Each of the plurality of learner blocks may include one or more successive learner layers. The number of learner layers in each learner block may be the same or different. In some embodiments, the learner block may include a plurality of successive learner layers having a similar structure. In some embodiments, each of the learner layer may include one or more nodes. The number of nodes in each learner layer may be the same or different.

In some embodiments, the processing engine 112 may select N learner blocks for training the learner model from the plurality of the learner blocks. Each of the N learner blocks may correspond to each of the N reference blocks in training the learner model in sequence of the N learner blocks in the learner model and the N reference blocks in the trained reference model. For example, the trained reference model may include ten reference blocks (e.g., a first reference block, a second reference block, . . . , and a tenth reference block from an input end to an output end of the trained reference model), and the learner model may include five learner blocks (e.g., a first learner block, a second learner block, . . . , and a fifth learner block from an input end to an output end of the learner model). The processing engine 112 may randomly select five reference blocks (i.e., N=5), for example, the first reference block, the third reference block, the fifth reference block, the ninth reference block, and the tenth reference block, corresponding to the first learner block, the second learner block, the third learner block, the fourth learner block, and the fifth learner block, respectively.

In 530, the processing engine 112 (e.g., the processor 220, the model training module 420) may train the learner model into a trained learner model by conducting a plurality of iterative operations.

In some embodiments, during each iterative operation, the processing engine 112 may update parameters in the learner model in order to make the learner model to mimic behaviors of the structurally more complicated reference model. For example, during each iterative operation, the processing engine 112 may input a same sample data set into the trained reference model and the learner model, respectively. The processing engine 112 may obtain outputs of each reference block and the corresponding learner block, respectively. The processing engine 112 may use the difference of two outputs of each reference block and the corresponding learner block to instruct the learner block to learn the performance of the corresponding reference block. The processing engine 112 may instruct each learner block by adjusting the parameters in each learner block. In some embodiments, the process and/or method for conducting an iterative operation may be found elsewhere in the present disclosure (e.g., FIG. 6 and the descriptions thereof).

In 540, the processing engine 112 (e.g., the processor 220, the model training module 420) may determine whether the learner model is convergent.

In some embodiments, the processing engine 112 may determine whether the learner model is convergent after each iterative operation. For example, the processing engine 112 may determine whether the learner model (i.e., an intermediate learner model after each iterative operation) is convergent based on a difference value between parameters of a current learner model in a current iterative operation and parameters of a last learner model in a last iterative operation. The difference value may be an average value of differences between two corresponding parameters in the current learner model and the last learner model. In some embodiments, the processing engine 112 may determine whether the difference value is less than a difference threshold. In response to a determination that the difference value is less than the difference threshold, the processing engine 112 may determine that the learner model is convergent. In response to a determination that the difference value is not less than the difference threshold, the processing engine 112 may determine that the learner model is not convergent. In some embodiments, the process and/or method for determination of the difference value may be found elsewhere in the present disclosure (e.g., FIG. 9 and the descriptions thereof).

In response to a determination that the learner model is not convergent, the processing engine 112 may execute the process 500 to return to 530 to further train the learner model by conducting a next iterative operation. The processing engine 112 may continue a next iterative operation until the processing engine 112 determines that the learner model is convergent.

In 550, the processing engine 112 (e.g., the processor 220, the model training module 420) may stop the iterative operation to assign the learner model as the trained learner model.

In some embodiments, when the learner model is convergent in the iterative operation, the processing engine 112 may determine that the corresponding learner model obtained at the stopped iterative operation is trained well. The performance of the learner model may be similar to the trained reference model after the iterative operation. The processing engine 112 may assign the learner model as the trained learner model. The trained learner model may learn fully from the trained reference model, and may mimic behaviors of the structurally more complicated reference model. For example, the trained learner model may mimic behaviors of the structurally more complicated reference model to make a prediction during solving a problem. For example, a prediction result generated from the trained learner model may be same with or similar to a prediction result generated from the trained reference model when solving a same problem.

It should be noted that the above description is merely provided for the purposes of illustration, and not intended to limit the scope of the present disclosure. For persons having ordinary skills in the art, multiple variations and modifications may be made under the teachings of the present disclosure. For example, operation 510 and operation 520 may be integrated into a single step. As another example, operation 520 may be performed before operation 510. However, those variations and modifications do not depart from the scope of the present disclosure.

Figure 6:
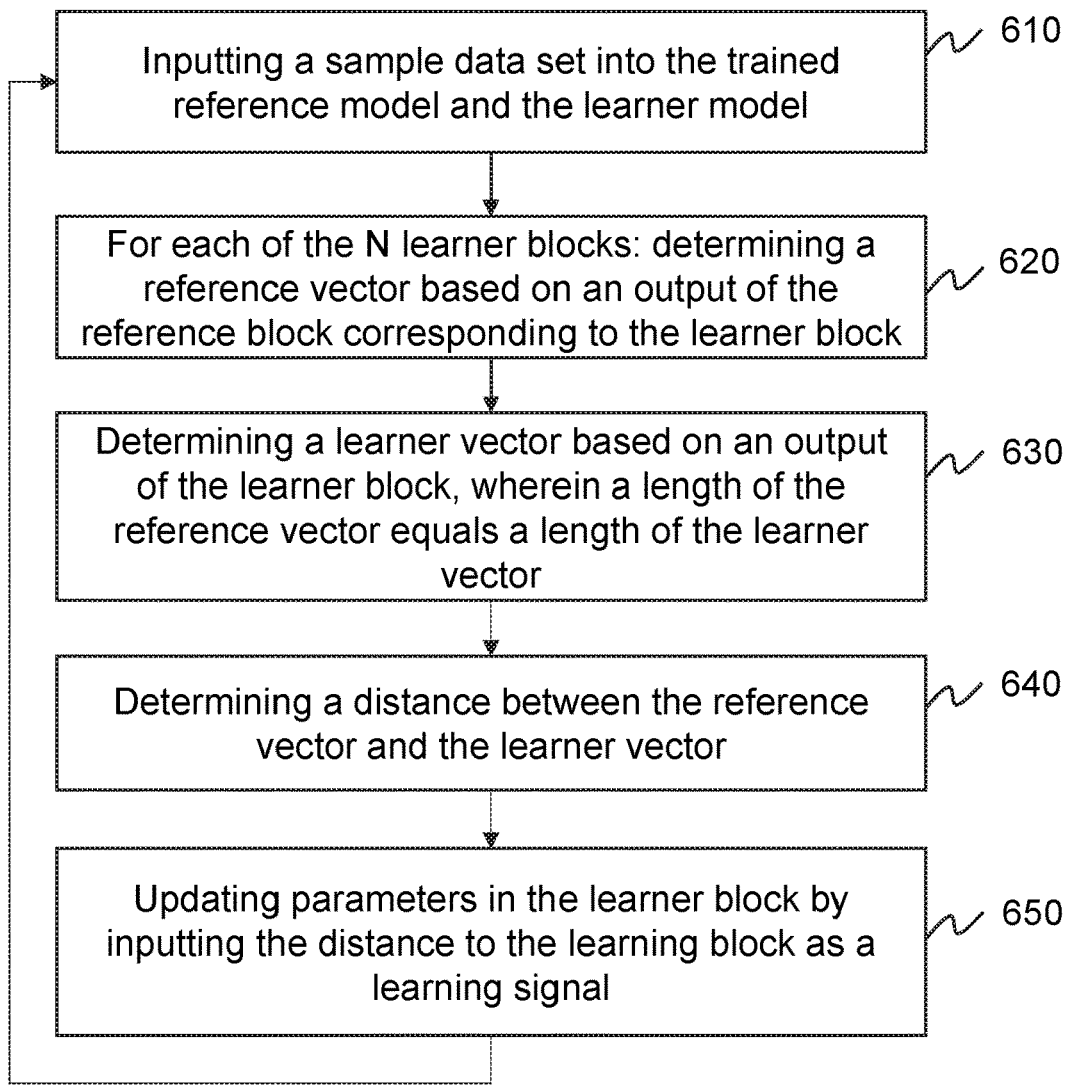
FIG. 6 is a flowchart illustrating an exemplary process for conducting an iterative operation according to some embodiments of the present disclosure.

FIG. 6 is a flowchart illustrating an exemplary process 600 for conducting an iterative operation according to some embodiments of the present disclosure. The process 600 may be executed by the AI system 100. For example, the process 600 may be implemented as a set of instructions (e.g., an application) stored in the storage ROM 230 or RAM 240. The processor 220 may execute the set of instructions, and when executing the instructions, it may be configured to perform the process 600. The operations of the illustrated process presented below are intended to be illustrative. In some embodiments, the process 600 may be accomplished with one or more additional operations not described and/or without one or more of the operations discussed. Additionally, the order in which the operations of the process as illustrated in FIG. 6 and described below is not intended to be limiting.

In 610, the processing engine 112 (e.g., the processor 220, the model training module 420) may input a sample data set into the trained reference model and the learner model.

Figure 7:
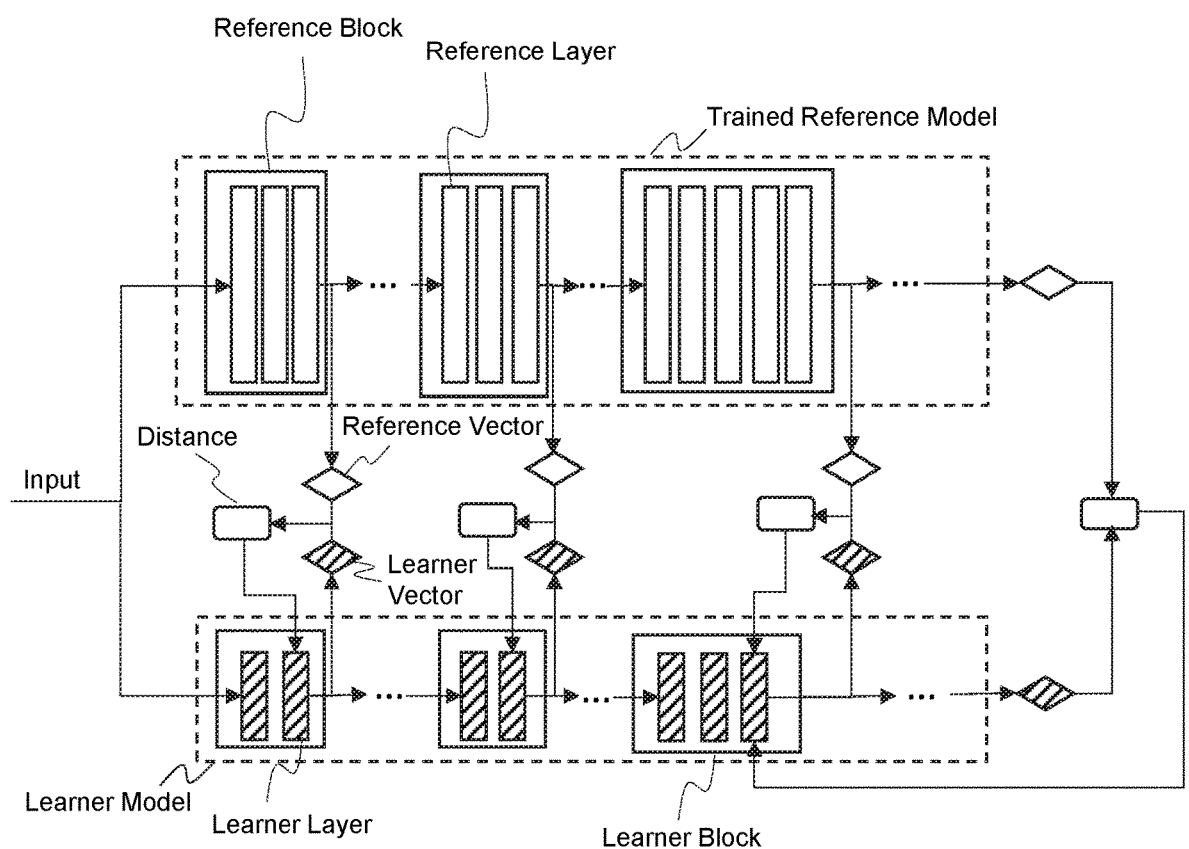
FIG. 7 is a schematic diagram illustrating exemplary process for training a learner model according to some embodiments of the present disclosure.

FIG. 7 is a schematic diagram illustrating exemplary process for training a learner model according to some embodiments of the present disclosure. As shown in FIG. 7, during each iterative operation, the processing engine 112 may input a same sample data set into the trained reference model and the learner model (in dotted boxes). In some embodiments, the inputted sample data set of different iteration operations may be the same or different. A format of the sample data set may satisfy an input format of the trained reference model and the learner model. For example, the sample data set may be in the format of character strings, numbers, images, audio, video, or the like, or any combination thereof. In some embodiments, the processing engine 112 may use raw data as the sample data set. For example, the processing engine 112 may process the raw data (e.g., perform a feature extraction on the raw data), and use processed data (e.g., features) to input into the trained reference model and the learner model. As shown in FIG. 7, the trained reference model may include at least three reference blocks (in solid boxes). The learner model may include at least three (at least three is only illustrated as an example but not limited in the present disclosure) learner blocks (in solid boxes). Each of the three reference blocks may correspond to each of the three learner blocks in turn from the input layer to the output layer of the two model. Each reference block may include at least one reference layer (each reference layer is shown in a hollow rectangle). Each learner block may include at least one learner layer (each learner layer is shown in a textural rectangle).

Operations 620-650 in the process 600 may be described for each of the N learner blocks. In 620, for each of the N learner blocks, the processing engine 112 (e.g., the processor 220, the model training module 420) may determine a reference vector based on an output of the reference block corresponding to the learner block.

As shown in FIG. 7, after the processing engine 112 inputting the sample data set into the trained reference model and the learner model, each reference layer in the trained reference model and each learner layer in the learner model may output a vector in turn from the input layer to the output layer of the corresponding trained reference model and the learner model. A vector outputted from a last layer may be an input of a next layer of the last layer. In some embodiments, the processing engine 112 may determine a reference vector (shown as hollow diamond in FIG. 7) corresponding to an output of each of the N reference blocks (N may be 3 as shown in FIG. 7). As used herein, an output of a reference block may be an output of a last reference layer of the reference block. In some embodiments, the processing engine 112 may determine a reference vector (shown as a hallow diamond) based on an output of each reference block. For example, the processing engine 112 may map the output of the reference block into the reference vector including a predetermined length according to a fully connected method. The predetermined length may be any suitable value. The predetermined length may be default parameters stored in a storage device (e.g., the storage 140, the storage 390). Additionally or alternatively, the predetermined length may be set manually or be determined by one or more components of the AI system 100 according to different situations. For example, the predetermined length of the reference vector may be less than, equal to, or greater than the length of the output of the reference block.

Figure 8A:
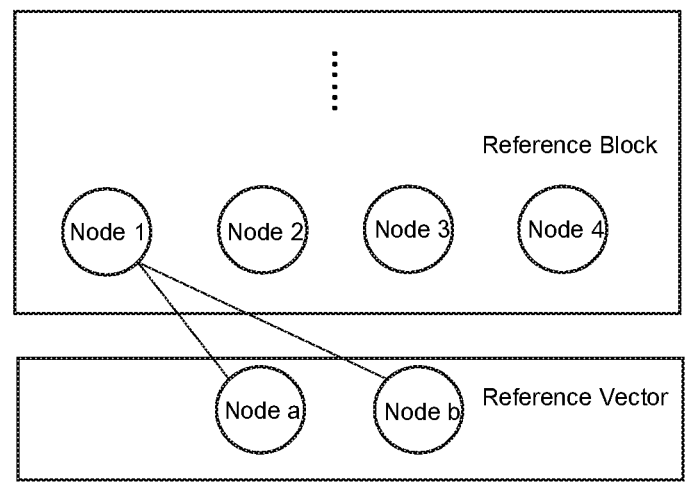
FIG. 8A is schematic diagram illustrating exemplary process for mapping an output of each reference block into a reference vector according to some embodiments of the present disclosure.

FIG. 8A is schematic diagram illustrating exemplary process for mapping an output of each reference block into a reference vector according to some embodiments of the present disclosure. As shown in FIG. 8A, the output of the reference block (the output of a last reference layer of the reference block) may have a length of four nodes, for example, a node 1, a node 2, a node 3, and a node 4. The reference vector may have a length of two nodes, for example, a node a and a node b. The processing engine 112 may map the output of the reference block including four nodes into the reference vector including two nodes. In some embodiments, the processing engine 112 may determine the node a and the node b based on the node 1, the node 2, the node 3, the node 4, and weights of the node 1, node 2, node 3, and the node 4, respectively. For example, the node a may be determined according to Equation (1):

$$\text{node } a = \text{node } 1 * W_1 + \text{node } 2 * W_2 + \text{node } 3 * W_3 + \text{node } 4 * W_4, \quad (1)$$

wherein $W_1$ refers to the weight of the node 1, $W_2$ refers to the weight of the node 2, $W_3$ refers to the weight of the node 3, and $W_4$ refers to the weight of the node 4. Similarly, the node b may be determined according to Equation (2):

$$\text{node } b = \text{node } 1 * W_5 + \text{node } 2 * W_6 + \text{node } 3 * W_7 + \text{node } 4 * W_8, \quad (2)$$

wherein $W_5$ refers to the weight of the node 1, $W_6$ refers to the weight of the node 2, $W_7$ refers to the weight of the node 3, and $W_8$ refers to the weight of the node 4. In some embodiments, the weights of each node in determining the reference vector may be preset by the AI system 100 or determined by the AI system 100 according to different situations.

In 630, the processing engine 112 (e.g., the processor 220, the model training module 420) may determine a learner vector based on an output of the learner block, wherein a length of the reference vector equals a length of the learner vector.

As shown in FIG. 7, the processing engine 112 may determine a learner vector (shown as a textural diamond) corresponding to an output of each of the N learner blocks. As used herein, an output of a learner block may be an output of a last learner layer of the learner block. In some embodiments, the processing engine 112 may determine the learner vector based on the output of the learner block. For example, the processing engine 112 may map the output of the learner block into the learner vector including the predetermined length according to the fully connected method. The length of the reference vector may be equal to the length of the learner vector. The predetermined length of the learner vector may be less than, equal to, or greater than the length of the output of the learner block.

Figure 8B:
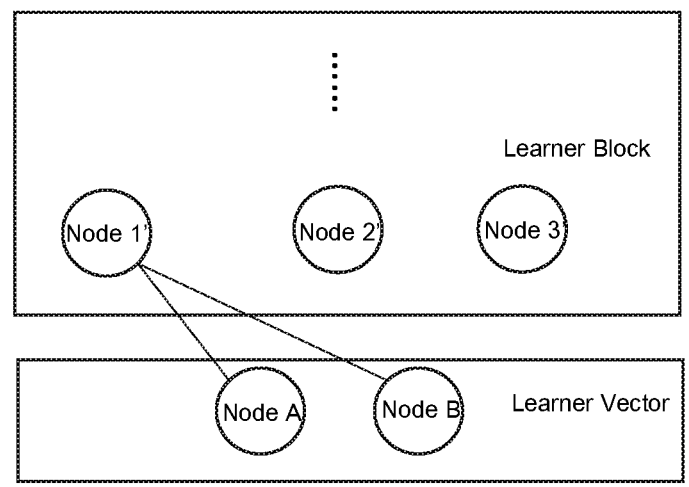
FIG. 8B is schematic diagram illustrating exemplary process for mapping an output of each learner block into a learner vector according to some embodiments of the present disclosure.

FIG. 8B is schematic diagram illustrating exemplary process for mapping an output of each learner block into a learner vector according to some embodiments of the present disclosure. As shown in FIG. 8B, the output of the learner block (the output of a last learner layer of the learner block) may have a length of three nodes, for example, a node 1', a node 2', and a node 3'. The learner vector may have a length of two nodes (same as the length of the reference vector shown in FIG. 8A), for example, a node A and a node B. The processing engine 112 may map the output of the learner block including three nodes into the learner vector including two nodes. In some embodiments, the processing engine 112 may determine the node A and the node B based on the node 1', the node 2', the node 3', and weights of the node 1', node 2', and node 3', respectively. For example, the node A may be determined according to Equation (3):

$$\text{node } A = \text{node } 1' * W'_1 + \text{node } 2' * W'_2 + \text{node } 3' * W'_3, \quad (3)$$

wherein $W'_1$ refers to the weight of the node 1', $W'_2$ refers to the weight of the node 2', and $W'_3$ refers to the weight of the node 3'. Similarly, the node B may be determined according to Equation (4):

$$\text{node } B = \text{node} * W'_4 + \text{node } 2' * W'_5 + \text{node } 3' * W'_6, \quad (4)$$

wherein $W'_4$ refers to the weight of the node 1', $W'_5$ refers to the weight of the node 2', $W'_6$ refers to the weight of the node 3'. In some embodiments, the weights of each node in determining the learner vector may be preset by the AI system 100 or determined by the AI system 100 according to different situations.

In some embodiments, the processing engine 112 may predetermine a length of the reference vector and the learner vector. For example, the processing engine 112 may preset that the lengths of the reference vector and the learner vector as a length equal to the length of the output of the reference block. For example, the length of the output of the reference block is 40 nodes, the length of the output of the learner block is 20 nodes. The processing engine 112 may map the learner vector of 20 nodes into a learner vector including 40 nodes according to the fully connected method. The processing engine 112 may use the output of the reference block of 40 nodes as the reference vector. Alternatively, the lengths of the reference vector and the learner vector may be any other same value (e.g., equals to the length of the output of the learner block, greater or less than the length of the output of the reference block or the learner block, etc.).

In 640, the processing engine 112 (e.g., the processor 220, the model training module 420) may determine a distance between the reference vector and the learner vector.

As used herein, a distance between a reference vector and a learner vector may indicate a difference between the reference vector and the learner vector, which may be used to evaluate a behavioral similarity between the corresponding reference block and the corresponding learner block. A smaller distance between the reference vector and the learner vector corresponds to a higher behavioral similarity between the reference block and the learner block. In some embodiments, the distance between the learner vector and the reference vector may include a Cross Entropy, a Mutual Information, a Kullback-Leibler Divergence, an Euclidean Distance, an Edit Distance, or the like.

As shown in FIG. 7, for each reference block and corresponding learner block, the processing engine 112 may determine a distance (shown as a rounded hollow rectangle) between the reference vector corresponding to the output of the reference block and the learner vector corresponding to the output of the learner block.

In some embodiments, the processing engine 112 may further determine an output reference vector based on an output of the trained reference model, and an output learner vector based on an output of the learner model. The output of the trained reference model (or the learner model) may be different from an output of a last reference block (or a last learner block) of the trained reference model (or the learner model). For example, the output of the last reference block of the trained reference model may include results of probabilities corresponding to different categories, and the output of the trained reference model may be a classified result after inputting the output of the last reference block into a classifier. The processing engine 112 may further determine an output distance between the output learner vector and the output reference vector.

In 650, the processing engine 112 (e.g., the processor 220, the model training module 420) may update parameters in the learner block by inputting the distance to the learner block as a learning signal.

In some embodiments, as shown in FIG. 7, for each of the N learner blocks, the processing engine 112 may input the distance between the learner vector and the corresponding reference vector (also refers to the learning signal) into the learner block. For example, the processing engine 112 may input the learning signal into the last learner layer of the learner block. The learning signal may be forward propagated from the last learner layer of the learner block to the first later of the learner block. The learner signal may influence parameters of the learner block, and further influence parameters of the whole learner model. For example, the learning signal may be used to update parameters in the learner block. As another example, the learning signal may be used to update parameters in the plurality of learner blocks of the learner model.

In some embodiments, the processing engine 112 may input the output distance between the trained reference model and the learner model to the last learner block of the learner model as a learning signal. For example, the processing engine 112 may input the output distance to a last learner layer of a last learner block of the learner model. The learning signal may be forward propagated from the last learner layer of the last learner block to the first layer of the last learner block. The learner signal may influence parameters of the last learner block, and further influence parameters of the whole learner model.

In some embodiments, the processing engine 112 may update the parameters in each learner block based on the corresponding learning signal and an algorithm (e.g., a Gradient Descent algorithm, a least square method, etc.).

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more other optional operations (e.g., a storing operation) may be added elsewhere in the exemplary process 600. For example, process 600 may further include storing information and/or data (e.g., parameters in the trained reference model and the learner model) associated with the trained reference model and the learner model. The processing engine 112 may store the information and/or data associated with the trained reference model and the learner model in a storage device (e.g., the storage 140), which is disclosed elsewhere in the present disclosure.

Figure 9:
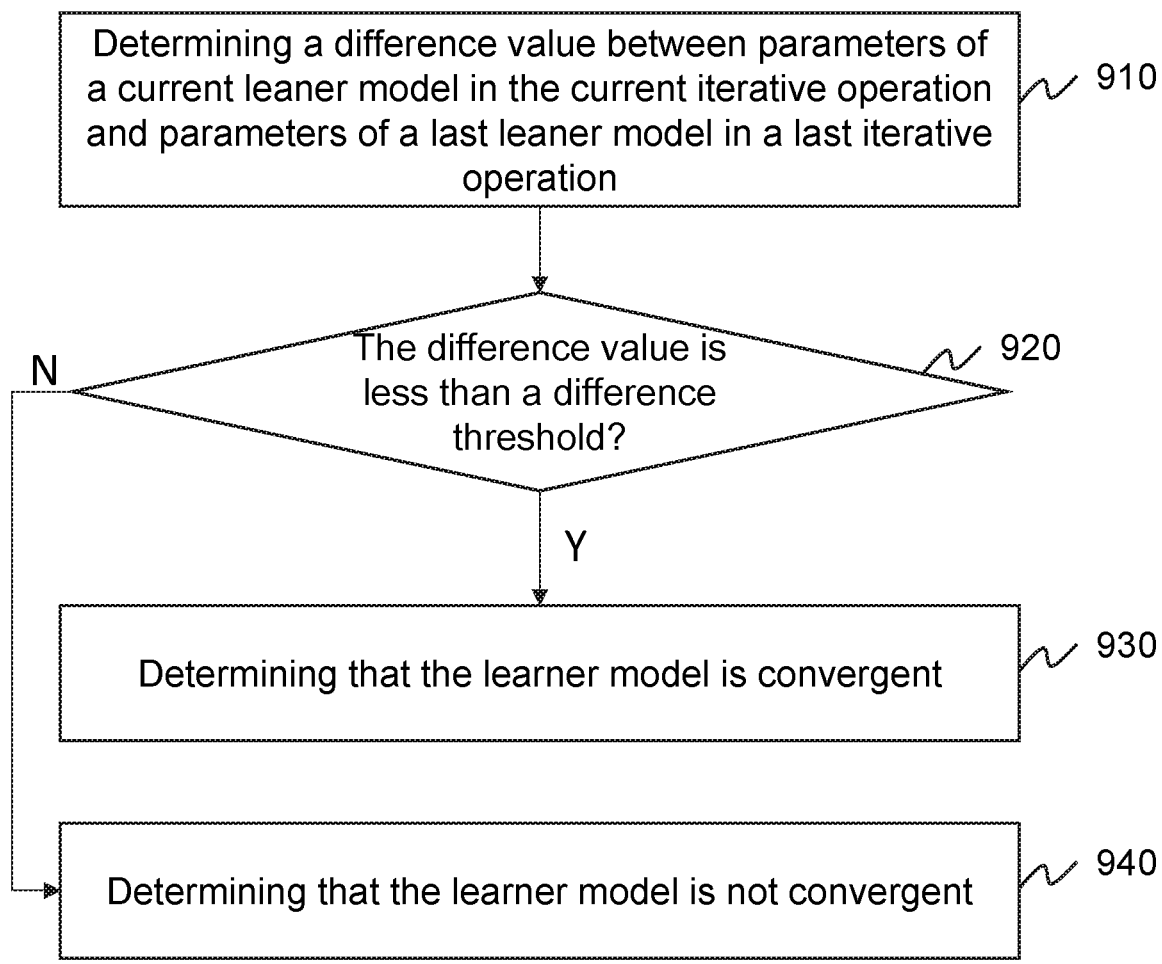
FIG. 9 is a flowchart illustrating an exemplary process for determining whether a learner model is convergent according to some embodiments of the present disclosure.

FIG. 9 is a flowchart illustrating an exemplary process for determining whether a learner model is convergent according to some embodiments of the present disclosure. The process 900 may be executed by the AI system 100. For example, the process 900 may be implemented as a set of instructions (e.g., an application) stored in the storage ROM 230 or RAM 240. The processor 220 may execute the set of instructions, and when executing the instructions, it may be configured to perform the process 900. The operations of the illustrated process presented below are intended to be illustrative. In some embodiments, the process 900 may be accomplished with one or more additional operations not described and/or without one or more of the operations discussed. Additionally, the order in which the operations of the process as illustrated in FIG. 9 and described below is not intended to be limiting.

In 910, the processing engine 112 (e.g., the processor 220, the model training module 420) may determine a difference value between parameters of a current learner model in the current iterative operation and parameters of a last learner model in a last iterative operation.

In some embodiments, each parameter in the current learner model may include a corresponding parameter in the last learner model. The processing engine 112 may determine a difference between two corresponding parameters in the current learner model and the last learner model. For example, the difference between each parameter in the current learner model and the corresponding parameter in the last learner model may be determined by subtracting the parameter in the current learner model (or in the last learner model) from the corresponding parameter in the last learner model (or in the current learner model). The processing engine 112 may determine an average value of the differences of a plurality of parameters in the current learner model and a plurality of corresponding parameters in the last learner model. As another example, the difference value may be a largest difference among the differences between two corresponding parameters in the current learner model and the last learner model. As still another example, the processing engine 112 may determine the difference value based on differences between two corresponding parameters in the current learner model and the last learner model, and weights of the each difference. Merely for illustration purpose, the processing engine 112 may assign different weights for different parameters in different layers. For example, a first difference of a first parameter in the input layer, a second difference of a second parameter in a middle layer, and a third difference of a third parameter in an output layer are 80, 90, and 95, respectively. The processing engine 112 may assign a first weight of the first parameter, a second weight of the second parameter, and a third weight of the third parameter as 20%, 30%, and 50%, respectively. The difference value may be 90.5 (80×20%+90×30%+95×50%=90.5).

In 920, the processing engine 112 (e.g., the processor 220, the model training module 420) may determine whether the difference value is less than a difference threshold.

In some embodiments, the difference threshold may be a default value stored in a storage device (e.g., the storage 140, the storage 390). Additionally or alternatively, the difference threshold may be set manually or be determined by one or more components of the AI system 100 according to different situations.

In response to a determination that the difference value is less than the difference threshold, in 930, the processing engine 112 (e.g., the processor 220, the model training module 420) may determine that the learner model is convergent. In some embodiments, when a learner model is convergent in an iterative operation, the processing engine 112 may determine that the corresponding learner model obtained at the iterative operation is trained well, and assign the corresponding learner model as a trained learner model.

In response to a determination that the difference value is not less than the difference threshold, in 940, the processing engine 112 (e.g., the processor 220, the model training module 420) may determine that the learner model is not convergent. The processing engine 112 may further train the learner model by conducting a next iterative operation as described in connection with FIGS. 6, 7, and 8.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 10:
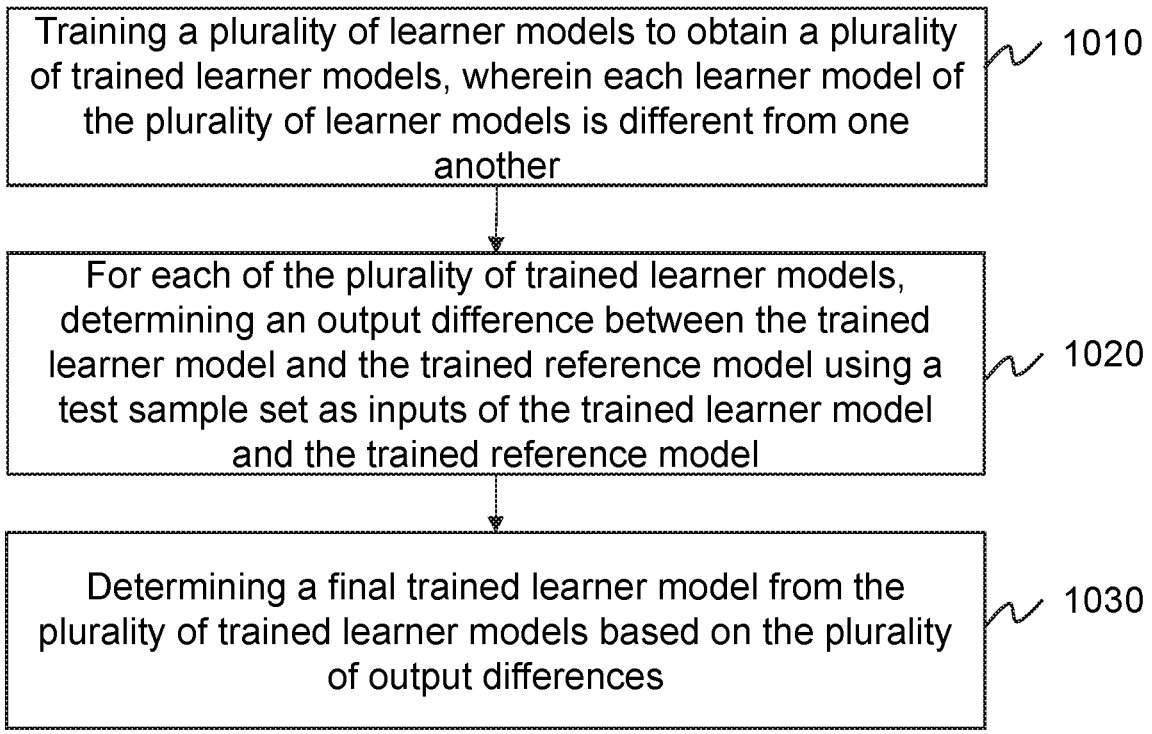
FIG. 10 is a flowchart illustrating an exemplary process for determining a final trained learner model according to some embodiments of the present disclosure.

FIG. 10 is a flowchart illustrating an exemplary process for determining a final trained learner model according to some embodiments of the present disclosure. The process 1000 may be executed by the AI system 100. For example, the process 1000 may be implemented as a set of instructions (e.g., an application) stored in the storage ROM 230 or RAM 240. The processor 220 may execute the set of instructions, and when executing the instructions, it may be configured to perform the process 1000. The operations of the illustrated process presented below are intended to be illustrative. In some embodiments, the process 1000 may be accomplished with one or more additional operations not described and/or without one or more of the operations discussed. Additionally, the order in which the operations of the process as illustrated in FIG. 10 and described below is not intended to be limiting.

In 1010, the processing engine 112 (e.g., the processor 220, the model training module 420) may train a plurality of learner models to obtain a plurality of trained learner models. In some embodiments, each learner model of the plurality of learner models may be different from one another.

In some embodiments, the plurality of learner models may have different structures. For example, different learner models may have different numbers of learner layers. As another example, different learner models may have different numbers of nodes in each learner layer. As still another example, different learner models may have different numbers of learner blocks, or different learner blocks may have different numbers of learner layers.

In some embodiments, the processing engine 112 may use a same trained reference model to train each of the plurality of learner models by conducting a method or process described elsewhere in the present disclosure (e.g., FIGS. 5-9 and the descriptions thereof). In some embodiments, the processing engine 112 may train the plurality of learner models simultaneously or in any order.

In some embodiments, the processing engine 112 may train each of the plurality of learner models using same reference blocks of the trained reference model. For example, the processing engine 112 may select a predetermined number of same reference blocks from the trained reference model, and the predetermined number of learner blocks from each learner model. Each of the predetermined number of same reference blocks may corresponding to each of the predetermined number of learner blocks, respectively. The processing engine 112 may use the method or process described elsewhere in the present disclosure (e.g., FIGS. 5-9 and the descriptions thereof) to train each of the plurality of learner models. In some embodiments, the processing engine 112 may train each of the plurality of learner models using different reference blocks of the trained reference model. For example, the processing engine 112 may select a predetermined number of different reference blocks from the trained reference model, and the predetermined number of learner blocks from each learner block. Each of the predetermined number of different reference blocks may corresponding to each of the predetermined number of learner blocks, respectively. The processing engine 112 may use the method or process described elsewhere in the present disclosure (e.g., FIGS. 5-9 and the descriptions thereof) to train each of the plurality of learner models. After determining that each of the plurality of learner model is convergent, the processing engine 112 may assign the learner model as a trained learner model. In some embodiments, different trained learner models may have different performances.

In some embodiments, the processing engine 112 (e.g., the processor 220, the model testing module 430) may test the plurality of trained learner models to obtain a final trained learner model. For example, in 1020, for each of the plurality of trained learner models, the processing engine 112 (e.g., the processor 220, the model testing module 430) may determine an output difference between the trained learner model and the trained reference model using a test data set as inputs of the trained learner model and the trained reference model.

In some embodiments, the processing engine 112 may test the plurality of trained learner models using a same test sample. For example, the processing engine 112 may input the same test sample into the plurality of the trained learner model and the trained reference model. In some embodiments, the test data set may be different from the sample data set.

As used herein, an output difference between a trained learner model and a trained reference model may be used to evaluate the performance of the trained learner model. In some embodiments, the processing engine 112 may determine the output difference between the trained learner model and the reference model based on outputs of the trained learner model and outputs of the reference model. For example, the processing engine 112 may determine the output difference by subtracting the output of the trained learner model (or the reference model) from the output of the reference model (or the trained learner model) respectively corresponding to a test sample data. The output difference may be an average value, a weighted average value, or a greatest difference value of the outputs of the test data set.

In 1030, the processing engine 112 (e.g., the processor 220, the model testing module 430) may determine a final trained learner model from the plurality of trained learner models based on the plurality of output differences.

In some embodiments, the processing engine 112 may determine the final trained learner model by comparing the plurality of output differences and/or the structures of the plurality of trained learner models, according to different application scenarios. For example, the processing engine 112 may select a trained learned model with a smallest output difference from the plurality of trained learner model as the final trained learner model. As another example, the processing engine 112 may determine a plurality of trained learned models with output differences that are less than a preset threshold as a plurality of candidate trained learner models. The processing engine 112 may further select a trained learner model with a simplest structure from the plurality of candidate trained learned models as the final learner model. As still another example, the processing engine may select a trained learner model that has a structure suitable for a computation capability of an application platform (e.g., a mobile phone, a pad, etc.) from the plurality of candidate trained learned models as the final learner model. In some embodiments, the processing engine 112 may send or upload or store the final trained learner model to the electronic device 130. The electronic device 130 may invoke the final trained learner model to perform human-like tasks, such as detecting objects, recognizing speech, identifying images, or making predictions.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 1703, Perl, COBOL 1702, PHP, ABAP, dynamic programming languages such as Python, Ruby and Groovy, or other programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the descriptions, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and describe.

I claim:

1. An artificial intelligent system for using a structurally simpler learner model to mimic behaviors of a structurally more complicated reference model, comprising:
at least one storage medium including a set of instructions for training a learner model; and
at least one processor in communication with the storage medium, wherein when executing the set of instructions, the at least one processor is directed to:
obtain a trained reference model at least including N reference blocks, wherein N is an integer greater than 2;
obtain a learner model at least including N learner blocks respectively corresponding to the N reference blocks of the trained reference model;
train the learner model into a trained learner model by conducting an iterative operation by:
inputting a sample data set into the trained reference model and the learner model;
for each of the N learner blocks:
determining a reference vector based on an output of the reference block corresponding to the learner block,
determining a learner vector based on an output of the learner block, wherein a length of the reference vector equals a length of the learner vector,
determining a distance between the reference vector and the learner vector to obtain a learning signal, and
updating parameters in the learner block by inputting the distance into the learner block as a learning signal;
determine whether the learner model is convergent; and
in response to a determination that the learner model is convergent, stop the iterative operation to assign the learner model as the trained learner model.

2. The system of claim 1, wherein each of the N reference blocks includes at least one reference layer, and each of the N learner blocks includes at least one learner layers.

3. The system of claim 2, wherein a total number of learner blocks in the learner model is less than a total number of reference blocks in the trained reference model;
a total number of learner layers in the learner model is less than a total number of reference layers in the trained reference model; and
a total number of nodes in each learner layer is less than a total number of nodes in each reference layer.

4. The system of claim 1, wherein the at least one processor is further directed to:
map an output of each reference block into a reference vector including a predetermined length; and
map an output of each learner block into a learner vector including the predetermined length.

5. The system of claim 1, wherein the distance between the learner vector and the reference vector includes at least one of: a Cross Entropy, a Mutual Information, a Kullback-Leibler Divergence, an Euclidean Distance, or an Edit Distance.

6. The system of claim 1, wherein during a current iterative operation to determine whether the learner model is convergent, the at least one processor is further directed to:
determine a difference value between parameters of a current learner model in the current iterative operation and parameters of a last learner model in a last iterative operation;
determine whether the difference value is less than a difference threshold; and
in response to a determination that the difference value is less than a difference threshold, determine that the learner model is convergent.

7. The system of claim 1, wherein the at least one processor is further directed to:
train a plurality of learner models to obtain a plurality of trained learner models, wherein each learner model in the plurality of learner models is different from one another; and
test the plurality of trained learner models to obtain a final trained learner model.

8. The system of claim 7, wherein to test the plurality of trained learner models, the at least one processor is further directed to:
for each of the plurality of trained learner models, determine an output difference between the trained learner model and the trained reference model using a test dataset as inputs of the trained learner model and the trained reference model; and
determine a final trained learner model from the plurality of trained learner models based on the plurality of output differences.

9. The system of claim 1, wherein the parameters in each learner block are updated based on the corresponding learning signal and a Gradient Descent algorithm.

10. An artificial intelligent method for using a structurally simpler learner model to mimic behaviors of a structurally more complicated reference model, comprising:
obtaining a trained reference model at least including N reference blocks, wherein N is an integer greater than 2;
obtaining a learner model at least including N learner blocks respectively corresponding to the N reference blocks of the trained reference model;
training the learner model into a trained learner model by conducting an iterative operation by:
inputting a sample data set into the trained reference model and the learner model;
for each of the N learner blocks:
determining a reference vector based on an output of the reference block corresponding to the learner block,
determining a learner vector based on an output of the learner block, wherein a length of the reference vector equals a length of the learner vector,
determining a distance between the reference vector and the learner vector to obtain a learning signal, and updating parameters in the learner block by inputting the distance into the learner block as a learning signal;

determining whether the learner model is convergent; and in response to a determination that the learner model is convergent, stopping the iterative operation to assign the learner model as the trained learner model.

11. The method of claim 10, wherein each of the N reference blocks includes at least one reference layer, and each of the N learner blocks includes at least one learner layers.

12. The method of claim 11, wherein a total number of learner blocks in the learner model is less than a total number of reference blocks in the trained reference model;

a total number of learner layers in the learner model is less than a total number of reference layers in the trained reference model; and a total number of nodes in each learner layer is less than a total number of nodes in each reference layer.

13. The method of claim 10, further comprising:

mapping an output of each reference block into a reference vector including a predetermined length; and mapping an output of each learner block into a learner vector including the predetermined length.

14. The method of claim 10, wherein the distance between the learner vector and the reference vector includes at least one of: a Cross Entropy, a Mutual Information, a Kullback-Leibler Divergence, an Euclidean Distance, or an Edit Distance.

15. The method of claim 10, wherein during a current iterative operation, the determining whether the learner model is convergent, further includes:

determining a difference value between parameters of a current learner model in the current iterative operation and parameters of a last learner model in a last iterative operation;

determining whether the difference value is less than a difference threshold; and in response to a determination that the difference value is less than a difference threshold, determining that the learner model is convergent.

16. The method of claim 10, further comprising:

training a plurality of learner models to obtain a plurality of trained learner models, wherein each learner model in the plurality of learner models is different from one another; and testing the plurality of trained learner models to obtain a final trained learner model.

17. The method of claim 16, wherein the testing of the plurality of trained learner models further includes:

for each of the plurality of trained learner models, determining an output difference between the trained learner model and the trained reference model using a test dataset as inputs of the trained learner model and the trained reference model; and determining a final trained learner model from the plurality of trained learner models based on the plurality of output differences.

18. The method of claim 10, wherein the parameters in each learner block are updated based on the corresponding learning signal and a Gradient Descent algorithm.

19. A non-transitory computer readable medium, comprising at least one set of artificially intelligent instructions compatible for using a structurally simpler learner model to mimic behaviors of a structurally more complicated reference model, wherein when executed by at least one processor of one or more electronic device, the at least one set of instructions directs the at least one processor to: obtain a trained reference model at least including N reference blocks, wherein N is an integer greater than 2; obtain a learner model at least including N learner blocks respectively corresponding to the N reference blocks of the trained reference model; train the learner model into a trained learner model by conducting an iterative operation by: inputting a sample data set into the trained reference model and the learner model; for each of the N learner blocks: determining a reference vector based on an output of the reference block corresponding to the learner block, determining a learner vector based on an output of the learner block, wherein a length of the reference vector equals a length of the learner vector, determining a distance between the reference vector and the learner vector to obtain a learning signal, and updating parameters in the learner block by inputting the distance into the learner block as a learning signal; determine whether the learner model is convergent; and in response to a determination that the learner model is convergent, stop the iterative operation to assign the learner model as the trained learner model.

20. The non-transitory computer readable medium of claim 19, wherein each of the N reference blocks includes at least one reference layer, and each of the N learner blocks includes at least one learner layers.

* * * * *